United States Patent
Murthy et al.

(10) Patent No.: US 8,346,737 B2
(45) Date of Patent: Jan. 1, 2013

(54) ENCODING OF HIERARCHICALLY ORGANIZED DATA FOR EFFICIENT STORAGE AND PROCESSING

(75) Inventors: Ravi Murthy, Fremont, CA (US); Eric Sedlar, San Francisco, CA (US); Dmitry Lenkov, San Jose, CA (US); Sivasankaran Chandrasekar, Palo Alto, CA (US); K. Karun, Mountain View, CA (US); Anjana Manian, Newark, CA (US); Olga Peschansky, Castro Valley, CA (US); Kwok Lun Alex Yiu, Sunnyvale, CA (US)

(73) Assignee: Oracle International Corporation, Redwood Shores, CA (US)

( * ) Notice: Subject to any disclaimer, the term of this patent is extended or adjusted under 35 U.S.C. 154(b) by 380 days.

(21) Appl. No.: 11/182,997

(22) Filed: Jul. 14, 2005

(65) Prior Publication Data

US 2006/0212467 A1    Sep. 21, 2006

Related U.S. Application Data

(60) Provisional application No. 60/664,003, filed on Mar. 21, 2005.

(51) Int. Cl.
*G06F 17/00* (2006.01)
*G06F 7/00* (2006.01)
(52) U.S. Cl. ........................................ 707/693; 715/242
(58) Field of Classification Search .............. 707/2, 102; 715/13; 717/136
See application file for complete search history.

(56) References Cited

U.S. PATENT DOCUMENTS

| 5,643,633 | A | 7/1997 | Telford et al. |
| 5,780,830 | A | 7/1998 | Boie et al. |
| 5,870,590 | A | 2/1999 | Kita et al. |

(Continued)

FOREIGN PATENT DOCUMENTS

WO    WO 01/42881 A2    6/2001

(Continued)

OTHER PUBLICATIONS

Bayardo et al. "Optimizing encoding: An evaluation of binary xml encoding optimizations for fast stream based xml processing" May 2004 Proceedings of the 13th international conference on World Wide Web WWW '04, Publisher: ACM Press.*

(Continued)

*Primary Examiner* — Pierre Vital
*Assistant Examiner* — Berhanu Mitiku
(74) *Attorney, Agent, or Firm* — Hickman Palermo Truong Becker Bingham Wong LLP (57) ABSTRACT

A compact binary encoding technique for information that is logically hierarchically structured, such as XML data, maintains all of the features of XML data in a useable form, such as the hierarchical structure underlying the data. Hence, data encoded in this format can undergo XML-based processing on-the-fly as it is being received or fetched, as if the data was being processed linearly in its textual character-based format. Processing of data encoded in this format can begin without having to wait for and decode the entire data set. The overhead due to XML tags is significantly minimized. The encoded data can be processed more efficiently because the data is pre-parsed. Values may be stored in their native type formats and, therefore, processing of the encoded data avoids costly type conversions. Further, any available structural constraint information can be effectively exploited.

9 Claims, 2 Drawing Sheets

U.S. PATENT DOCUMENTS

| | | | |
|---|---|---|---|
| 5,991,713 | A | 11/1999 | Unger et al. |
| 6,018,747 | A | 1/2000 | Burns et al. |
| 6,330,573 | B1 | 12/2001 | Salisbury et al. |
| 6,414,610 | B1 | 7/2002 | Smith |
| 6,427,123 | B1 | 7/2002 | Sedlar |
| 6,519,597 | B1 | 2/2003 | Cheng et al. |
| 6,584,459 | B1 | 6/2003 | Chang et al. |
| 6,598,055 | B1 | 7/2003 | Keesey et al. |
| 6,635,088 | B1* | 10/2003 | Hind et al. .................. 715/236 |
| 6,697,805 | B1 | 2/2004 | Choquier et al. |
| 6,883,137 | B1* | 4/2005 | Girardot et al. ............. 715/242 |
| 6,966,029 | B1 | 11/2005 | Ahern |
| 7,013,424 | B2* | 3/2006 | James et al. ................. 715/239 |
| 7,013,425 | B2* | 3/2006 | Kataoka ...................... 715/242 |
| 7,031,956 | B1 | 4/2006 | Lee et al. |
| 7,080,094 | B2* | 7/2006 | Dapp et al. .................. 707/102 |
| 7,139,746 | B2 | 11/2006 | Shin et al. |
| 7,143,397 | B2* | 11/2006 | Imaura ........................ 717/136 |
| 7,149,753 | B2* | 12/2006 | Lin ..................................... 1/1 |
| 7,162,485 | B2 | 1/2007 | Gottlob et al. |
| 7,171,404 | B2 | 1/2007 | Lindblad et al. |
| 7,171,407 | B2 | 1/2007 | Barton et al. |
| 7,216,127 | B2* | 5/2007 | Auerbach .................... 707/100 |
| 7,318,194 | B2 | 1/2008 | Achilles et al. |
| 7,398,265 | B2 | 7/2008 | Thusoo et al. |
| 7,441,185 | B2 | 10/2008 | Coulson et al. |
| 7,496,612 | B2 | 2/2009 | Magee et al. |
| 7,500,017 | B2 | 3/2009 | Cseri et al. |
| 2001/0049675 | A1 | 12/2001 | Mandler et al. |
| 2002/0038319 | A1* | 3/2002 | Yahagi ......................... 707/513 |
| 2002/0065822 | A1* | 5/2002 | Itani ................................ 707/7 |
| 2002/0078068 | A1 | 6/2002 | Krishnaprasad et al. |
| 2002/0123993 | A1* | 9/2002 | Chau et al. ...................... 707/5 |
| 2002/0152267 | A1 | 10/2002 | Lennon |
| 2002/0188613 | A1 | 12/2002 | Chakraborty et al. |
| 2003/0041302 | A1 | 2/2003 | McDonald |
| 2003/0093626 | A1 | 5/2003 | Fister |
| 2003/0131051 | A1 | 7/2003 | Lection et al. |
| 2003/0177341 | A1* | 9/2003 | Devillers ..................... 712/227 |
| 2003/0212662 | A1 | 11/2003 | Shin et al. |
| 2003/0212664 | A1 | 11/2003 | Breining et al. |
| 2004/0006741 | A1* | 1/2004 | Radja et al. .................. 715/513 |
| 2004/0028049 | A1* | 2/2004 | Wan ............................. 370/394 |
| 2004/0044659 | A1 | 3/2004 | Judd et al. |
| 2004/0083209 | A1 | 4/2004 | Shin |
| 2004/0088320 | A1 | 5/2004 | Perry |
| 2004/0148278 | A1 | 7/2004 | Milo et al. |
| 2004/0167864 | A1 | 8/2004 | Wang et al. |
| 2004/0205551 | A1 | 10/2004 | Santos |
| 2004/0210573 | A1 | 10/2004 | Abe et al. |
| 2004/0267760 | A1 | 12/2004 | Brundage et al. |
| 2005/0033733 | A1* | 2/2005 | Shadmon et al. ................ 707/2 |
| 2005/0038688 | A1 | 2/2005 | Collins et al. |
| 2005/0050016 | A1 | 3/2005 | Stanoi et al. |
| 2005/0050054 | A1 | 3/2005 | Clark et al. |
| 2005/0060647 | A1 | 3/2005 | Doan et al. |
| 2005/0086639 | A1* | 4/2005 | Min et al. ..................... 717/114 |
| 2005/0091188 | A1 | 4/2005 | Pal et al. |
| 2005/0120031 | A1* | 6/2005 | Ishii ............................. 707/100 |
| 2005/0192955 | A1* | 9/2005 | Farrell ............................. 707/5 |
| 2005/0228792 | A1 | 10/2005 | Chandrasekaran et al. |
| 2005/0228818 | A1 | 10/2005 | Murthy et al. |
| 2005/0229158 | A1 | 10/2005 | Thusoo et al. |
| 2005/0257201 | A1 | 11/2005 | Rose et al. |
| 2005/0278616 | A1* | 12/2005 | Eller ............................. 715/513 |
| 2005/0289125 | A1 | 12/2005 | Liu et al. |
| 2006/0021246 | A1 | 2/2006 | Schulze et al. |
| 2006/0041838 | A1* | 2/2006 | Khan ........................... 715/513 |
| 2006/0085737 | A1 | 4/2006 | Liu |
| 2006/0168513 | A1 | 7/2006 | Coulson et al. |
| 2006/0173865 | A1* | 8/2006 | Fong ............................ 707/100 |
| 2006/0195865 | A1* | 8/2006 | Fablet ............................. 725/32 |
| 2006/0212467 | A1 | 9/2006 | Murthy et al. |
| 2006/0235868 | A1* | 10/2006 | Achilles et al. ............... 707/102 |
| 2006/0265689 | A1* | 11/2006 | Kuznetsov et al. ........... 717/117 |
| 2006/0277179 | A1 | 12/2006 | Bailey |
| 2007/0006078 | A1 | 1/2007 | Jewsbury et al. |
| 2008/0028296 | A1 | 1/2008 | Aharoni |
| 2008/0098001 | A1 | 4/2008 | Gupta et al. |
| 2008/0098019 | A1 | 4/2008 | Sthanikam et al. |
| 2008/0098020 | A1 | 4/2008 | Gupta et al. |

FOREIGN PATENT DOCUMENTS

| | | |
|---|---|---|
| WO | WO 033107576 | 12/2003 |
| WO | WO 2006026534 | 3/2006 |

OTHER PUBLICATIONS

Liu et al. "XML retrieval: Configurable indexing and ranking for XML information retrieval" Jul. 2004 Proceedings of the 27th annual international ACM SIGIR conference on Research and development in information retrieval SIGIR '04, Publisher: ACM Press.*

Liefke et al. "XMill: an efficient compressor for XML data" May 2000 ACM SIGMOD Record , Proceedings of the 2000 ACM SIGMOD international conference on Management of data SIGMOD '00, vol. 29 Issue 2, Publisher: ACM Press.*

Min et al. "XML indexing and compression: XPRESS: a queriable compression for XML data" Jun. 2003 Proceedings of the 2003 ACM SIGMOD international conference on Management of data SIGMOD '03, Publisher: ACM Press.*

Zou et al. "XML processing: Ctree: a compact tree for indexing XML data" Nov. 2004 Proceedings of the 6th annual ACM international workshop on Web information and data management WIDM '04, Publisher: ACM Press.*

Girardot et al Girardot et al "Miliau: an encoding format for efficient representation and exchange of XMLover the Web" Marc Girardot, Institut Eurécom, Sophia Antipolis, France Neel Sundaresan, IBM Almaden Research Center, San Jose, California, USA.*

Girardot et al "Miliau: an encoding format for efficient representation and exchange of XMLover the Web" Marc Girardot, Institute Eurecom, Sophia Antipolis, France, Neel Sundaresan, IBM Almaden Research Center, San Jose, California, USA.*

PCT/US2007/010163, Notification of Transmittal of the International Search Report and the Written Opinion of the International Searching Authority, Oct. 12, 2007, 12 pages.

Shankar Pal et al., "Indexing XML Data Stored in a Relational Database", Proceedings of the 30th VLDB Conference, 2004, 12 pages.

MacKenzie et al., "Finding Files", FindUtils, Version 4.1.2, Source Code, GNU.org, Nov. 1997, source files, code. C, 22 pages.

Cormen et al., "Introduction to Algorithms", MIT Press, 2001, 2nd Edition, 4 pages.

European Patent Office, "Communication pursuant to Article 94 (3) EPC", European patent application 05732473.3-1225, dated Feb. 4, 2008, 7 pages.

State Intellectual Property Office of P.R.C., "Notification of the First Office Action", European patent application 2005800186273.9, dated Oct. 12, 2007, 9 pages.

Claims, European patent application 2005800186273.9, 3 pages, Sep. 28, 2006.

Claims, European patent application 05732473.3-1225, 3 pages, Apr. 6, 2005.

Claims, Foreign Application No. 200580018627.9, 3 pages, Sep. 28, 2006.

State Intellectual Property Office of P.R.C., "Notification of the First Office Action", Foreign Application No. 200580018627.9, mailed Oct. 12, 2007, 9 pages, Apr. 6, 2005.

* cited by examiner

ENCODING OF HIERARCHICALLY ORGANIZED DATA FOR EFFICIENT STORAGE AND PROCESSING

CROSS-REFERENCE TO RELATED APPLICATIONS

This application claims the benefit of priority to U.S. Provisional Patent Application No. 60/664,003 filed on Mar. 21, 2005, entitled "A Mechanism for Efficient Schema-Based Binary Encoding of XML", the content of which is incorporated by this reference in its entirety for all purposes as if fully disclosed herein.

FIELD OF THE INVENTION

The present invention relates to a format for encoding information that is logically organized in a hierarchical structure, such as XML content, for efficient storage and processing. Specifically, the present invention relates to encoding the hierarchically organized information in a format that maintains characteristics of the information, such as the hierarchical structure.

BACKGROUND

The eXtensible Markup Language (XML) has become the most popular format for exchanging information between applications. XML content is self-descriptive (i.e., it contains tags along with data), but the standard XML serialization format is text-based, including the numbers and dates. This results in a significant increase in the size of XML documents compared to other proprietary formats for capturing the same data. The increased size of XML documents causes overhead costs during transmission, due to limited network bandwidths, as well as slower performance of storage and retrieval operations, due to limited disk I/O bandwidth.

Processing XML data typically requires parsing the tags to access the values. DOMs (Document Object Models) can be used, but they typically require a lot of memory. Thus, the parsing step can be costly and can cause significant application performance degradation.

Further, the values may need to be converted from the textual representation to their native datatype (e.g., integer, float or date) before the values can be processed by the application. Associated type conversion costs also degrade overall application performance.

Approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS OF THE INVENTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Throughout this description, numerous references are made to XML documents and associated hierarchies, to provide specific examples of a possible implementation of the broader techniques described herein. However, these techniques are not limited strictly to implementation with XML documents. Rather, these techniques may be implemented in the context of any tag-based, delimiter-based, or text-based hierarchical information that is logically organized as a hierarchy.

Functional Overview of Embodiments

Techniques are described for encoding and processing information that is logically hierarchically structured, such as XML data in XML documents. Typically, XML data is stored as a simple binary representation of the characters that make up the XML data, that is, the XML tags (i.e., elements and attributes) and values. By contrast, with the encoding format described herein, XML data is stored in a compact binary form that maintains all of the features of XML data in a useable form, such as the hierarchical structure underlying the data (e.g., the data model or infoset), the notion of elements and attributes, etc. Hence, data encoded in this format can undergo XML-based processing on-the-fly as it is being received (e.g., as it is streamed) or fetched (e.g., as it is being fetched from a database), as if the data was being processed linearly in its textual character-based form. Significantly, processing of data encoded in this format can begin without having to wait for and decode the entire data set, because processing the data requires interpretation rather than decompression.

This compact binary format significantly minimizes the overhead due to XML tags. Hence, the encoded XML is more compact than a binary representation of the corresponding textual character representation. This binary format can be processed more efficiently than parsing because the data is effectively pre-parsed. In one embodiment, values are stored in their native type formats and, therefore, processing avoids costly type conversions.

Salient features of the encoding format are as follows.

(A) Tokenization of tags: Element names and attribute names are replaced with token IDs. Similarly, namespace URLs and prefixes can also be tokenized.

(B) Array mode optimization: If the same tag is repeated multiple times (which occurs frequently in real world XML), token IDs can also be avoided, leading to further compaction.

(C) Native type encoding: If data type related metadata (e.g., an XML schema) is present, the binary encoding format exploits it in various ways. One way of exploiting the metadata is to store values in their native datatypes, e.g., integers, floats and dates are stored as such and require no unnecessary conversions.

(D) Schema sequential optimization: If structure related metadata (e.g., an XML schema) constrains the order of elements to be in a specific order, token IDs can be avoided within the encoding. This leads to the optimal encoding of data with minimal overhead, due to exploitation of the XML data model.

(E) Sectioning of XML: A large XML document can be split into smaller pieces (sections). The binary format for such a document contains references to the various sections which can be retrieved and managed independently. This enables lazy manifestation (on-demand) of XML documents.

(F) Out-of-band communication of token definitions and annotated schemas: A client application can access the token definitions and schemas in an out-of-band fashion. Hence the mappings of token IDs to their names, etc., are completely omitted from the encoded XML data.

As current applications scale up to large volumes of XML data (i.e., large numbers of large XML documents), the performance issues with text-based encoding are exacerbated. The compact binary encoding described herein addresses many of these issues and enables significant improvements in application performance. The encoding format offers combinations of several features that lead to many advantages over the prior text-based XML format, including the following.

Size: The binary encoding of XML is significantly smaller than the original XML document. This leads to improved efficiency during transmission, storage and retrieval operations.

Processing Speed: The binary encoding of XML avoids the need for costly parsing and unnecessary type conversions, thus speeding up application processing.

Operations Codes

In one embodiment, XML data is encoded from its original character-based format into a sequence of operation codes ("opcodes"). Each opcode has a fixed number of operands. Opcodes can be associated with XML elements and attributes and associated values. Use of opcodes and operands to represent XML elements and attributes effectively pre-parses the XML data. Consequently, a receiver/consumer of the encoded data need not spend computational resources parsing the data. Furthermore, representing XML tags and values with opcodes and operands reduces the size of the data. This is because an opcode and an operand may require as little as a byte each to encode, rather than several bytes for each corresponding character representation of similar data. Examples of opcodes are described hereafter.

Tokenization of Tags

In one embodiment, XML tags are tokenized. Tokenization of tags (i.e., XML elements and attributes) means that the character (e.g., textual) representation of the tag is replaced with a short token identifier. Hence, a tag that, in its character form, may require several bytes of memory, often only requires one byte (if less than 256 tokens) to encode as a token. For example, an XML element tag <Name> requires four bytes to encode in a simple binary representation of its characters, whereas a corresponding token for that tag (e.g., a token value "1") only requires one byte to encode in the compact binary format described herein. In one embodiment, namespaces and prefixes that characterize a namespace URL are also tokenized.

In one embodiment, token identifiers can be generated by any encoding system, i.e., generated in a distributed manner. For example, token identifiers can be generated by a database server that manages the XML data repository, by client applications, or by any tier associated with the processing of XML data. The capability of global construction of token identifiers is enabled through use of a global hash algorithm that is an element of the encoding format. Thus, any machine or mechanism that can run the hash algorithm is capable of generating token identifiers for data being encoded, thereby providing an efficient global utilization of resources.

A token definition mapping is constructed to map token identifiers to token definitions, i.e., what particular XML element or attribute is represented by a particular token identifier. Token definitions may be stored and transmitted inline in the XML document to which the definitions apply. Alternatively, a global token dictionary may be constructed and stored as global metadata in a database for use with a collection of XML documents stored in the database. For example, a token dictionary may be constructed to define all the tokens used for a particular namespace, where a namespace provides context for and scopes the element and attribute names for XML data associated with the namespace. Thus, a client application can access the token definitions in an out-of-band fashion, and the mappings of token IDs to their names, etc. are completely omitted from the encoded XML data. Furthermore, a global token dictionary provides benefits regarding querying and indexing the collection of XML documents to which the token definitions apply.

An example of the use of opcodes and tokens is based on the following simplified XML fragment:

```
<root>
  <A>123</A>
  <A>345</A>
</root>.
```

A corresponding character representation of the fragment, according to an embodiment of the invention, is as follows.

| | |
|---|---|
| STE | 1 |
| STE | 2 |
| VAL | 123 |
| ENDE | |
| STE | 2 |
| VAL | 345 |
| ENDE | |
| ENDE | | where: "STE" is a "start of element" opcode, indicating the start of an element;

"1" is a token identifier for the <root> element, "2" is a token identifier for the <A> element;

"VAL" is a "value" opcode, with respective associated values "123" and "345"; and "ENDE" is an "end of element" opcode, indicating the end of an element.

Note that the opcodes are represented above in a character-based format for the purpose of explanation. However, when encoded according to the compact binary format described, the opcodes can actually be encoded as simple byte values. For non-limiting examples, the "start of element" opcode may be encoded in byte format as {0000 0000}, the "end of element" opcode may be encoded in byte format as {0000 0001}, the "value" opcode may be encoded in byte format as {0000 001 0}, and so on.

Array Mode Optimization

In one embodiment, "array mode optimization" is used in encoding XML data. The general purpose of array mode optimization is to avoid repeating, in the encoded data, tokens/operands that are repeated in the un-encoded XML data. Thus, a particular opcode is used to represent "start of element in array mode." The particular opcode is used to represent that the applicable element or attribute is the same as a previous element or attribute.

Continuing with the foregoing example data, use of array mode optimization could result in the following character representation of the example data:

|      |     |
| ---- | --- |
| STE  | 1   |
| STE  | 2   |
| VAL  | 123 |
| ENDE |     |
| STEAM |    |
| VAL  | 345 |
| ENDE |     |
| ENDE |     | where "STEAM" is a "start of element in array mode" opcode, indicating that this element is the same as a previous element. Different opcodes can be used for different types of relationships between the current element and the previous element. For example, a particular opcode can be used to indicate that the current element is the same as the previous sibling of the current element and a different particular opcode can be used to indicate the current element is a the same as the previous (in document order) element. In the example, the STEAM opcode is used to indicate that the second instance of <A> (with value of 345) is the same as the previous sibling, i.e., the first instance of <A> (with value of 123).

Hence, in the presence of repetitive tags, use of token identifiers in the encoded data, as operands to opcodes, can be avoided altogether. For example, use of the operand "2" is avoided for the second <A> element. Consequently, use of array mode opcodes results in a more compact encoded representation of the data.

Native Type Encoding

In one embodiment, native data type encoding is used in encoding XML data values. The general purpose of native type encoding is to exploit knowledge of the data type of a value to allow for encoding the value in a more compact machine representation than a simple binary representation of the value characters. Use of native type encoding is a metadata-based optimization (e.g., XML schema-based), which relies on data type definitions in an XML schema, or similar metadata, to which an XML document corresponds. Because values are stored according to their native data type, a receiver/consumer of the encoded data need not spend computational resources converting values from character-based representations to native type representations for further processing.

Native data type encoding exploits the availability of inherent compact representations (i.e., valid literals) of certain data types, such as integers, Boolean, float and date data types. The schema specifies the data type for a value, and the data type inherently has a well-known compact representation. For example, a Boolean "true" and "false" can simply be encoded with one bit in its native data type as a "0" or "1". For another example, a conventional binary representation of the characters "1", "2" and "3" of the value "123" requires three bytes to encode, whereas the value "123" encoded in its native type as an integer requires only one byte to encode.

Schema Sequential Optimization

In one embodiment, "schema sequential optimization" is used in encoding XML data elements and attributes. The general purpose of schema sequential optimization encoding is to exploit knowledge of schema-specified constraints regarding the structure of elements and attributes within a compliant XML document, to avoid the use of some opcodes and operands if possible. Use of schema sequential optimization encoding relies on structural constraints, i.e., the order and cardinality of tags, in an XML schema to which an XML document corresponds. Because the particular order and cardinality of some tags within an XML document may be constrained by the corresponding schema, such constraints can be relied upon when encoding the XML data from the document.

An example of the use of schema sequential optimization is based on the following simplified XML fragment:

```
<root>
    <A>123</A>
    <B>456</B>
</root>.
```

A corresponding character representation of the fragment, without the use of schema sequential optimization, is as follows.

|      |     |
| ---- | --- |
| STE  | 1   |
| STE  | 2   |
| VAL  | 123 |
| ENDE |     |
| STE  | 3   |
| VAL  | 456 |
| ENDE |     |
| ENDE |     |

However, assume a schema corresponding to the XML data specifies that the root must have only one reference to element "A" followed by only one reference to element "B". Thus, a corresponding character representation of the fragment, according to an embodiment using schema sequential optimization, is as follows.

|      |     |
| ---- | --- |
| STE  | 1   |
| VAL  | 123 |
| VAL  | 456 |
| ENDE |     |

Hence, use of certain opcodes (STE and ENDE) and corresponding operands ("2" and "3", respectively) is avoided, resulting in a more compact representation of the underlying data. Use of those opcodes and operands are avoidable because it is known that the data must be specifically structured as specified in the schema. Therefore, the encoding scheme can rely on such constraints, i.e., that one instance of element "A" is followed by only one instance of element "B".

XML schemas that constrain corresponding documents to a certain structure are common, in the case of Purchase Order documents, for example. Furthermore, schema sequential optimization is applicable to structured document sections (XML document sectioning is described in greater detail herein) also, and need not be applied at a document-level.

Sectioning of XML Data

The content of U.S. patent application Ser. No. 11/083,828, entitled "Method and System for Flexible Sectioning of XML Data in a Database System", is incorporated by this reference in its entirety for all purposes as if fully disclosed herein. U.S. patent application Ser. No. 11/083,828 describes a mechanism allowing XML documents to be selectively shredded based on user-specified criteria that define how to section the data. In particular, users can specify the criteria for sectioning XML documents using XPath expressions, and can specify the table in which sections matching specified XPath expressions are to be stored. Users can specify sectioning criteria, for sectioning an XML document that does not have a well-defined schema, into relational database tables.

The techniques described in the 11/083,828 reference allow for converting an XML document into a smaller document with section references (e.g., logical pointers) to sections of content that were divided out physically from the original document. Consequently, sections can be fetched on demand rather than fetching the entire document. The techniques described hereafter are applicable to encoding sectioned documents, such as sectioned documents as described in the 11/083,828 reference.

In one embodiment, a particular opcode is used to indicate an occurrence of a section root, referred to as a node reference. In one embodiment, operands for the opcode include (a) a root element path ID, and (b) an order key.

The root element path ID identifies the XML path to the root element of the section. The path ID can be used to identify in which table the section data is stored.

The order key uniquely identifies a section and can be used for lookup of the section data in the table identified by the root element path ID. That is, the order key indicates where the section root node resides within the hierarchical structure of the XML document containing the node. The content of U.S. patent application Ser. No. 10/884,311, entitled "Index for Accessing XML Data", is incorporated by this reference in its entirety for all purposes as if fully disclosed herein. The 10/884,311 reference describes a mechanism for indexing paths, values and order information in XML documents. The mechanism involves using a set of structures, which collectively constitute an index, for accessing XML data.

As described in the 10/884,311 reference, the order key may be represented using a Dewey-type value. Specifically, the order key of a node is created by appending a value to the order key of the node's immediate parent, where the appended value indicates the position, among the children of the parent node, of that particular child node. For example, assume that a particular node D is the child of a node C, which itself is a child of a node B that is a child of a node A. Assume further that node D has the order key 1.2.4.3. The final "3" in the order key indicates that the node D is the third child of its parent node C. Similarly, the "4" indicates that node C is the fourth child of node B. The "2" indicates that Node B is the second child of node A. The leading 1 indicates that node A is the root node (i.e. has no parent).

In one embodiment, a series of node references are compressed using a particular opcode, referred to herein as a collection reference. A collection reference opcode indicates the presence of a contiguous list of section references and, therefore, refers to a collection of nodes. In one embodiment, operands for the collection reference opcode include (a) a set of one or more path IDs, (b) the order key for the first section referenced by the collection reference opcode, and (c) the order key for the last section referenced by the collection reference opcode. Hence, multiple consecutive section reference opcodes and operands are compressed into a single collection reference opcode with associated operands, which provide the information necessary to fetch the data for the sections referenced by the collection reference.

Chunk Encoding of XML Data

In one embodiment, an XML document is encoded in chunks of data. In other words, subsets of data of a specific size (for a non-limiting example, 64 Kb) are encoded, subset by subset. Whether or not to use chunking and the size of the chunks can be negotiated between the data producer and consumer, as part of typical negotiations preceding the actual exchange of data.

In a related embodiment, encoding and transmitting XML data is performed in chunks. That is, a chunk is encoded and then transmitted, the next chunk is encoded and then transmitted, and so on. Thus, for example, in the case of a collision with respect to constructing tokens based on the hash algorithm, the encoder can mark the chunk with an indicator of the collision, send to the consumer, and continue with encoding the next chunk. For example, in the case of a client application encoding data to be stored in a database, the client can mark the chunk with an indicator of the collision, send to the database server, and continue with encoding the next chunk.

A Method for Encoding XML Data in Compact Format

Figure 1:
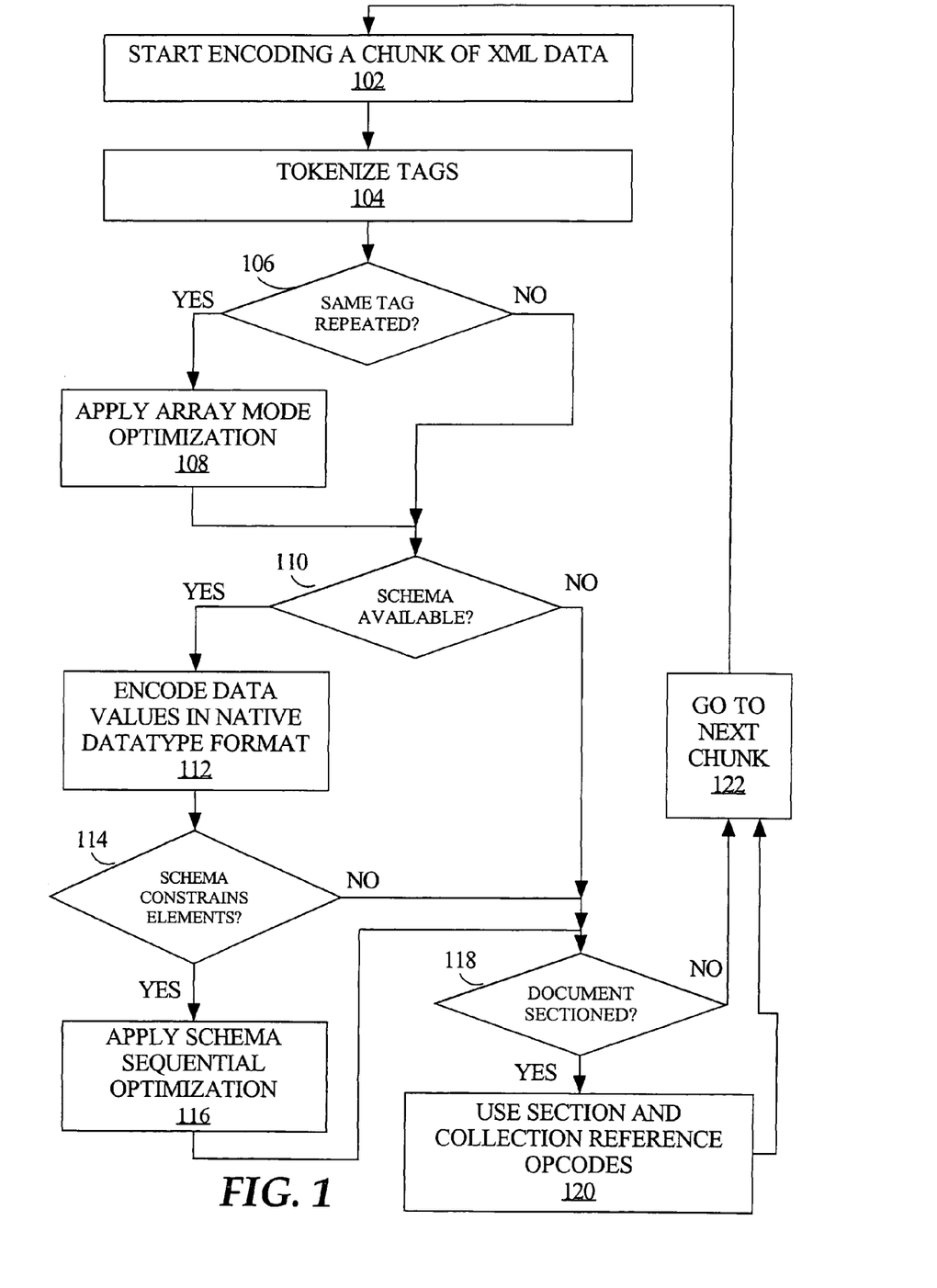
FIG. 1 is a flow diagram that illustrates a method for encoding XML data in compact form, according to an embodiment of the invention.

FIG. 1 is a flow diagram that illustrates a method for encoding XML data in compact form, according to an embodiment of the invention. The method illustrated in FIG. 1 may be performed by executing one or more sequences of instructions by one or more processors, such as within a computer system (e.g., computer system 200 of FIG. 2). The method of FIG. 1 incorporates the foregoing embodiments of the compact binary format. However, utilization of these embodiments may vary from implementation to implementation. Therefore, implementations need not utilize every embodiment, rather, implementations could benefit from utilization of any one of the embodiments. For greater detail for any of the blocks depicted in FIG. 1, refer to the corresponding section herein.

At block 102, encoding of a chunk of XML data is started. For example, encoding is started for a subset of data of a specific size, from an XML document or other hierarchically structured data.

At block 104, the XML tags are tokenized. For example, each tag is input into a hash algorithm to generate a token identifier for the tag. Thus, the character (e.g., textual) representation of the tag is replaced with the short token identifier. As described, unique tokens can be generated for a document, or for a namespace, or for a database.

At decision block 106, it is determined whether any tags are repeated. If no tags are repeating a previous tag (e.g., a previous sibling tag or a previous tag in document order), then processing is passed to decision block 110. If tags are repeated, then array mode optimization is applied at block 108 to avoid repeating, in the encoded data, tokens/operands that are repeated in the un-encoded data. That is, a particular opcode is used to represent that the applicable element or attribute is the same as a previous element or attribute. Processing is then passed to decision block 110.

At decision block 110, it is determined whether a schema is available that corresponds to the XML document. If there is no schema available, then processing is passed to decision block 118. If there is a schema available, then data values are encoded in their native type format based on the schema, at block 112, to encode the value in a more compact machine representation than a simple binary representation of the value's characters.

At decision block 114, it is determined whether the schema constrains any XML elements to a particular order and cardinality. If the schema does not so constrain any elements, then processing is passed to decision block 118. If the schema does so constrain some elements, then schema sequential optimization is applied at block 116, to exploit knowledge of the schema-specified constraints to avoid the use of some opcodes and operands. Processing passes to decision block 118.

At decision block 118, it is determined whether the XML document is sectioned. If the document is not sectioned (as briefly described herein and in U.S. patent application Ser. No. 11/083,828), then go to the next chunk at block 122 and processing passes back to block 102 to start processing the next chunk, if there is one. If the document is sectioned, then use section reference opcodes and/or collection reference opcodes at block 120, to compact the section references while still providing the information necessary to fetch the data for the referenced sections. Processing passes to block 122 to go to the next chunk, and then to block 102 to start processing the next chunk, if there is one.

Once all of the data is encoded, then processing can stop for that document. As mentioned, the data can be encoded, and transmitted or stored, chunk by chunk. Therefore, there could be a block between block 120 and block 122, at which the encoded chunk is transmitted or stored, prior to or concurrent with the start of processing the next chunk.

Backwards Compatibility in the Presence of Schema Evolution

Techniques are described that enable backwards-compatible schema evolution, in the context of (a) native type encoding and (b) schema sequential optimization. The result is that instances of data that were encoded with a previous version of a schema can still be decoded based on newer versions of schemas.

Native Type Encoding

In one embodiment, providing backwards compatibility in scenarios in which a data type may be relaxed from one schema version to the next schema version, the encoding type used to encode a value for an element or attribute is encoded into the format. For example, a value of data type "number" is encoded with the opcode "VALNUM", rather than "VAL", to indicate that the value is encoded in "number" data type. Consequently, if the next schema version changes the data type of the value from "number" to "string", then the data instance based on the previous schema version can still be decoded because the encoding data type is declared in the encoded data. Hence, existing encoded instances do not require change in order to conform to the new schema. However, if the existing instances are encoded again, then conformance with the new schema is recommended.

Schema Sequential Optimization

If a schema is changed such that the hierarchical structure of a corresponding document may change, then an existing instance using the schema sequential optimization may be corrupt, based on the new structure. That is, the known schema structural constraints that were exploited in application of schema sequential optimization to the existing instance may have been modified or eliminated in the new schema version and, therefore, can no longer be relied upon.

In one embodiment, for scenarios in which a schema is changed such that the hierarchical structure of a corresponding document may change, system level schema annotations are added to the new schema version at the time of versioning. These annotations can be in the form of an XML representation according to a standard XML annotation. These annotations are a mapping of the hierarchical positions of elements according to the structural constraints specified in the original schema. Returning to the schema sequential optimization example, where the schema specifies that the root must have only one reference to element "A" followed by only one reference to element "B", this specification is annotated to the new schema. Consequently, previous instances of data that rely on a child element "B" following a child element "A" can still be decoded using the new schema version because the new version contains the annotation indicating the old constraint. However, re-encoding the data based on the new schema version would no longer be able to rely on the obsolete constraint specified in the original schema version.

In one embodiment, the annotations are in the form of a "kidList", which is a list of identifiers ("kidNums") for child elements of the root. For example, the new schema may be annotated to include "kid 1=A" to indicate that tag <A> is the first child of the root and "kid 2=B" to indicate that tag <B> is the second child of the root, which follows the first child.

Other changes to a schema are allowed, which still meet the backwards-compatibility goal. For example, (a) adding an optional element or attribute to a new schema version, (b) adding new values, and (c) increasing maxOccurs, maxLength facets are all schema evolutions that are inherently backwards-compatible.

Hardware Overview

Figure 2:
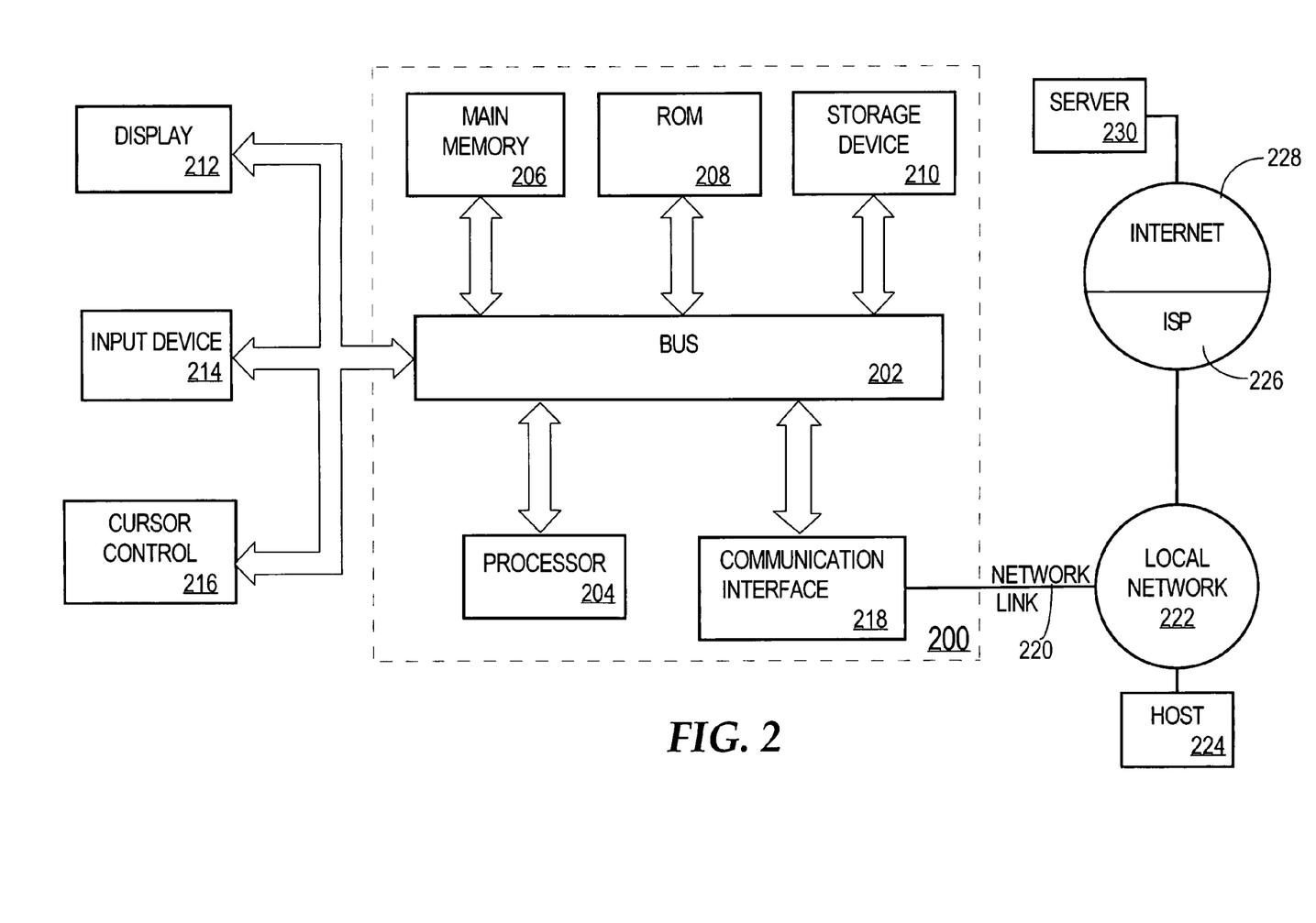
FIG. 2 is a block diagram that illustrates a computer system upon which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for encoding XML data, the XML data comprising a plurality of tags in a hierarchy, the method comprising:
   encoding said XML data to produce an encoded representation of said XML data that does not include an encoded representation of a particular tag of the plurality of tags;
   wherein encoding the XML data comprises:
      determining whether a schema that corresponds to the XML data constrains the particular tag within the hierarchy to a particular hierarchical level and a particular order within the level, and
      in response to determining that the particular tag is constrained within the hierarchy to the particular hierarchical level and the particular order within the level, omitting an encoded representation of the particular tag from the encoded representation of said XML data;
   wherein a constraint specified in the schema associated with the XML data specifies that a particular parent tag in the hierarchy must have only one reference in the hierarchy to a particular child tag followed by only one reference in the hierarchy to the particular tag;
   wherein the encoded representation of said XML data:
      includes an encoded representation the particular parent tag,
      does not include an encoded representation of the particular child tag, and
      does not include an encoded representation of the particular tag;
   wherein the method is performed by one or more computing devices.

2. A method for encoding XML data, the XML data comprising a plurality of tags in a hierarchy, the method comprising:
   encoding the XML data to produce an encoded representation of said XML data;
   wherein encoding the XML data includes:
      determining whether the plurality of tags comprises a set of consecutive tags that are repeats of each other;
      in response to determining that the plurality of tags comprises the set of consecutive tags that are repeats of each other,
         using, in the encoded representation, a first opcode and associated operand to represent the first tag in the set of consecutive tags, and
         using, in the encoded representation, a second opcode without an operand to represent all of the second tag and any subsequent tags in the set of consecutive tags;

wherein the second opcode indicates that all of the second tag and any subsequent tags are repeats of the first tag;

wherein the encoded representation, other than the second opcode, does not include any representation of any of the second and any subsequent tags of the set of consecutive tags;

wherein the method is performed by one or more computing devices.

3. A volatile or non-volatile machine-readable non-transitory storage medium storing one or more sequences of instructions for encoding XML data, the XML data comprising one or more tags in a hierarchy, said instructions, when executed by one or more processors, causes the one or more processors to perform:

encoding said XML data to produce an encoded representation of said XML data that does not include an encoded representation of a particular tag of the plurality of tags;

wherein encoding the XML data comprises:

determining whether a schema that corresponds to the XML data constrains the particular tag within the hierarchy to a particular hierarchical level and a particular order within the level, and in response to determining that the particular tag is constrained within the hierarchy to the particular hierarchical level and the particular order within the level, omitting an encoded representation of the particular tag from the encoded representation of said XML data;

wherein a constraint specified in the schema associated with the XML data specifies that a particular parent to in the hierarchy must have only one reference in the hierarchy to a particular child tag followed by only one reference in the hierarchy to the particular tag;

wherein the encoded representation of said XML data:

includes an encoded representation the particular parent tag, does not include an encoded representation of the particular child tag, and does not include an encoded representation of the particular tag.

4. The volatile or non-volatile machine-readable non-transitory storage medium of claim 3, further storing instructions which, when executed by the one or more processors, causes the one or more processors to perform:

in response to an original schema being modified, adding annotations to a modified schema;

wherein the annotations map each of the plurality of tags to a corresponding hierarchical order of the tag from the original schema.

5. A volatile or non-volatile machine-readable non-transitory storage medium storing one or more sequences of instructions for encoding XML data, the XML data comprising a plurality of tags in a hierarchy, said instructions, when executed by one or more processors, causes the one or more processors to perform:

encoding the XML data to produce an encoded representation of said XML data; wherein encoding the XML data includes:

determining whether the plurality of tags comprises a set of consecutive tags that are repeats of each other;

in response to determining that the plurality of tags comprises the set of consecutive tags that are repeats of each other, using, in the encoded representation, a first opcode and associated operand to represent the first tag in the set of consecutive tags, and using, in the encoded representation, a second opcode without an operand to represent all of the second tag and any subsequent tags in the set of consecutive tags;

wherein the second opcode indicates that all of the second tag and any subsequent tags are repeats of the first tag;

wherein the encoded representation, other than the second opcode, does not include any representation of any of the second and any subsequent tags of the set of consecutive tags.

6. The volatile or non-volatile machine-readable non-transitory storage medium of claim 5, wherein the set of consecutive tags are consecutive tag siblings of one another in said hierarchy, and wherein the second opcode indicates that the set of consecutive tags are consecutive tag siblings of one another in said hierarchy.

7. The volatile or non-volatile machine-readable non-transitory storage medium of claim 5, wherein the set of consecutive tags are consecutive in document order, and wherein the second opcode indicates that the set of consecutive tags are consecutive in document order.

8. The method of claim 2, wherein the set of consecutive tags are consecutive tag siblings of one another in said hierarchy, and wherein the second opcode indicates that the set of consecutive tags are consecutive tag siblings of one another in said hierarchy.

9. The method of claim 2, wherein the set of consecutive tags are consecutive in document order, and wherein the second opcode indicates that the set of consecutive tags are consecutive in document order.

* * * * *

UNITED STATES PATENT AND TRADEMARK OFFICE
CERTIFICATE OF CORRECTION

PATENT NO. : 8,346,737 B2
APPLICATION NO. : 11/182997
DATED : January 1, 2013
INVENTOR(S) : Murthy et al.

It is certified that error appears in the above-identified patent and that said Letters Patent is hereby corrected as shown below:

ON THE TITLE PAGE:
On page 2, in column 2, under "Foreign Patent Documents", line 1, delete "033107576" and insert -- 03107576 --, therefor.

On page 2, in column 2, under "Other Publications", line 17, delete "Girardot et al Girardot et al "Miliau:" and insert -- Girardot et al "Millau: --, therefor.

On page 2, in column 2, under "Other Publications", line 18, delete "XMLover" and insert -- XML over --, therefor.

On page 2, in column 2, under "Other Publications", line 21, delete ""Miliau:" and insert -- "Millau: --, therefor.

On page 2, in column 2, under "Other Publications", line 22, delete "XMLover" and insert -- XML over --, therefor.

IN THE SPECIFICATIONS:
In column 4, line 55, delete "{0000 001 0}," and insert -- {0000 0010}, -- therefor.

In column 10, line 2, delete "("kidNums)" and insert -- ("kidNums") --, therefor.

IN THE CLAIMS:

In column 12, line 42, in Claim 1, before "the particular" insert -- of --.

In column 13, line 31, in Claim 3, delete "to" and insert -- tag --, therefor.

In column 13, line 36, in Claim 3, before "the particular" insert -- of --.

Signed and Sealed this
Sixteenth Day of April, 2013

Teresa Stanek Rea
*Acting Director of the United States Patent and Trademark Office*